US009098620B2

(12) United States Patent
Zhou et al.

(10) Patent No.: US 9,098,620 B2
(45) Date of Patent: Aug. 4, 2015

(54) SYSTEM AND METHOD FOR PARALLEL MODEL CHECKING UTILIZING PARALLEL STRUCTURED DUPLICATE DETECTION

(75) Inventors: Rong Zhou, San Jose, CA (US); Ethan Burns, Dover, NH (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/470,280

(22) Filed: May 12, 2012

(65) Prior Publication Data
US 2013/0304755 A1 Nov. 14, 2013

(51) Int. Cl.
G06F 17/30 (2006.01)
G06F 11/36 (2006.01)
G06F 9/44 (2006.01)

(52) U.S. Cl.
CPC .............. G06F 11/3608 (2013.01); G06F 8/36 (2013.01); G06F 9/442 (2013.01)

(58) Field of Classification Search
CPC .................................................. G06F 11/3608
USPC .......................................................... 707/758
See application file for complete search history.

(56) References Cited

U.S. PATENT DOCUMENTS

2006/0218534 A1* 9/2006 Kahlon et al. ................. 717/124
2008/0133523 A1* 6/2008 Norton et al. ...................... 707/6
2009/0024586 A1* 1/2009 Zhou ................................. 707/3

OTHER PUBLICATIONS

Akihiro Kishimoto et al., "Scalable, Parallel Best-First Search for Optimal Sequential Planning," Proceedings of the Nineteenth International Conference on Automated Planning and Scheduling (ICAPS-09), 2009, pp. 201-208.*
Gerard J. Holzmann et al., "The design of a Multi-core Extension of the SPIN Model Checker," I EEE Transactions on Software Engineering 33(10), pp. 659-674, 2007.*
Rong Zhou et al., "Structured Duplicate Detection in External-Memory Graph Search," Department of Computer Science and Engineering, Mississippi State University, Mississippi State, MS, American Association for Artificial Intelligence, 2004, pp. 683-688.*
Ethan Burns et al., "Best-First Heuristic Search for Multicore Machines," Journal of Artificial Intelligence Research 39, 2010, pp. 689-743.
Matthew Evett et al., "PRA*: Massively-Parallel Heuristic-Search," Journal of Parallel and Distributed Computing 25(2), pages pp. 133-143, 1995.
Gerard J. Holzmann et al., "An Improvement in Formal Verification," Proceedings of the 7th IFIP WG6.1 International Conference on Formal Description Techniques (FORTE-94), 1994, 13 pages.

(Continued)

*Primary Examiner* — Wei Zhen
*Assistant Examiner* — Mohammed Huda
(74) *Attorney, Agent, or Firm* — Fay Sharpe LLP

(57) ABSTRACT

A technique for parallelizing model checking using breadth-first search in order to detect deadlocks and safety property violations is disclosed. The technique is based on Parallel Structured Duplicate Detection (PSDD) and preserves a model checker's ability to perform partial order reduction with parallel breadth-first search. PSDD also uses much less memory and is able to achieve better parallel speedup and verify models more quickly. Also, PSDD used herein is able to make use of external memory, such as hard disks, to reduce the memory requirements of verification.

18 Claims, 13 Drawing Sheets

(56) References Cited

OTHER PUBLICATIONS

Dragan Bosnacki et al., "Improving Spin's Partial-Order Reduction for Breadth-First Search," Godefroid, P. (ed.), Model Checking Software, Lecture Notes in Computer Science. vol. 3639, p. 902, Springer Berlin I Heidelberg, 2005.

Gerard J. Holzmann et al., "The design of a Multi-core Extension of the SPIN Model Checker," IEEE Transactions on Software Engineering 33(10), pp. 659-674, 2007.

Rob Pike et al., "Plan 9 from Bell Labs," Computing Systems 8(3), pp. 221-254, 1995.

Yifei Dong et al., "Fighting livelock in the GNU i-Protocol: A case study in explicit-state model checking," International Journal on Software Tools for Technology Transfer (STTT) 4(4), pp. 505-528, 2003.

Rong Zhou et al., "Dynamic State-Space Partitioning in External-Memory Graph Search," Twenty-First International Conference on Automated Planning and Scheduling (ICAPS-11), Freiburg, Germany, Jun. 2011, 8 pages.

Rong Zhou et al., "Edge Partitioning in Parallel Structured Duplicate Detection," The 2010 International Symposium on Combinatorial Search (SOCS-10), 2010, 2 pages.

Rong Zhou et al., "Parallel Structured Duplicate Detection," 22nd National Conference on Artificial Intelligence (AAAI-07), Vancouver, British Columbia, Canada, Jul. 2007, Association for the Advancement of Artificial Intelligence, 7 pages.

\* cited by examiner

SYSTEM AND METHOD FOR PARALLEL MODEL CHECKING UTILIZING PARALLEL STRUCTURED DUPLICATE DETECTION

CROSS REFERENCE TO RELATED PATENTS AND APPLICATIONS

The presently described embodiments are related to U.S. Pat. No. 7,805,454, which is incorporated herein by reference in its entirety.

BACKGROUND

Model checking is a fundamental tool used in the creation and verification of asynchronous and distributed systems. For example, model checkers may be used to verify distributed software systems used in a variety of technologies, fields and industries. Because the actions performed by each component of such a system may be interleaved in many ways, there can be a large number of configurations of the system as a whole.

In order to aid in verifying the correctness of an asynchronous system, an abstract model may be created and used along with a model checker which is able to enumerate all reachable system configurations. During its enumeration, the model checker can ensure that the system does not exhibit any invalid behaviors or reach any invalid states. If such an error is found then a trace of the actions that led to it can be reported back to the user. This trace information can be valuable when creating and debugging a new system. Additionally, if the model checker is unable to find any invalid behaviors, then it is evidence that the system is in fact correct. In order to enumerate all possible states of an asynchronous system, many popular model checkers treat the configuration space as an implicitly defined graph where nodes correspond to system states and edges are the possible transitions of each component. A path through this graph gives one possible interleaving of the actions that the system may perform. Once the graph is defined, an exhaustive search algorithm can then explore all reachable states of the system looking for ones that violate certain properties. As is typical with implicit graphs, however, there can be a very large number of nodes causing the search to take a prohibitive amount of time or memory.

Further, in non-model checking environments, the heuristic search and automated planning communities have been quite successful in developing new search frameworks that take advantage of modern multi-core processors to improve the performance of their algorithms. In addition, these frameworks have also been shown to be successful at offloading a significant portion of the memory requirement of a large graph search from RAM to external storage such as a hard disk.

INCORPORATION BY REFERENCE

U.S. Pat. No. 7,805,454 is incorporated by reference herein in its entirety.

BRIEF DESCRIPTION

In one aspect of the presently described embodiments, a method comprises developing an abstract representation of the state space of the system, performing a parallel reachability analysis using a structured duplicate detection technique based on the abstract representation, determining invalid behaviors or states of the system based on the performing of the parallel reachability analysis using a structured duplicate detection technique and, proving the correctness of the system if no invalid behaviors or states are found.

In another aspect of the presently described embodiments, the method further comprises notifying a user of a sequence of system transitions that led to the invalid behaviors or states.

In another aspect of the presently described embodiments, the method further comprises initiating a model checker in a shared or distributed memory and parallel processing environment.

In another aspect of the presently described embodiments, partial order reduction is maintained.

In another aspect of the presently described embodiments, the developing of the abstract representation comprises using a subset of concurrent processes represented by finite automata having a current state and a set of transitions.

In another aspect of the presently described embodiments, the transitions are used to determine predecessor and successor relations and only automata of processes of the subset are used to compute the abstract representation.

In another aspect of the presently described embodiments, developing the abstract representation comprises generating an abstract graph lazily as needed.

In another aspect of the presently described embodiments, the abstract graph is generated in parallel by multiple core processors of a processing device, or multiple processors of a computer or multiple computers in a cluster.

In another aspect of the presently described embodiments, generating the abstract graph comprises ensuring that only a single automata will change across a transition.

In another aspect of the presently described embodiments, a computational system comprises means for developing an abstract representation of the state space of a system to be verified, means for performing a parallel reachability analysis using a structured duplicate detection technique based on the abstract representation, and, means for determining invalid behaviors or states of the system to be verified based on the performing of the parallel reachability analysis using a structured duplicate detection technique.

In another aspect of the presently described embodiments, the computational system further comprises means for notifying a user of a sequence of system transitions that led to the invalid behaviors or states.

In another aspect of the presently described embodiments, the computational system further comprises a means for initiating a model checker.

In another aspect of the presently described embodiments, a computational system comprises at least one processor operative to develop an abstract representation of the state space of a system to be verified, perform a parallel reachability analysis using structured duplicate detection technique based on the abstract representation and determine invalid behaviors or states of the system to be verified based on the performing of the parallel structured duplicate detection technique, and storage devices operative to interact with the processor to perform the parallel reachability analysis using structured duplicate detection technique.

In another aspect of the presently described embodiments, the at least one processor comprises a processor having multiple core processors.

In another aspect of the presently described embodiments, the at least one processor comprise multiple processors.

In another aspect of the presently described embodiments, the multiple processors are distributed in a network.

In another aspect of the presently described embodiments, the storage devices comprise internal and external memory devices.

In another aspect of the presently described embodiments, the storage devices are configured to improve input/output efficiency.

In another aspect of the presently described embodiments, the storage devices comprise solid state devices or magnetic disks.

DETAILED DESCRIPTION

Figure 1A:
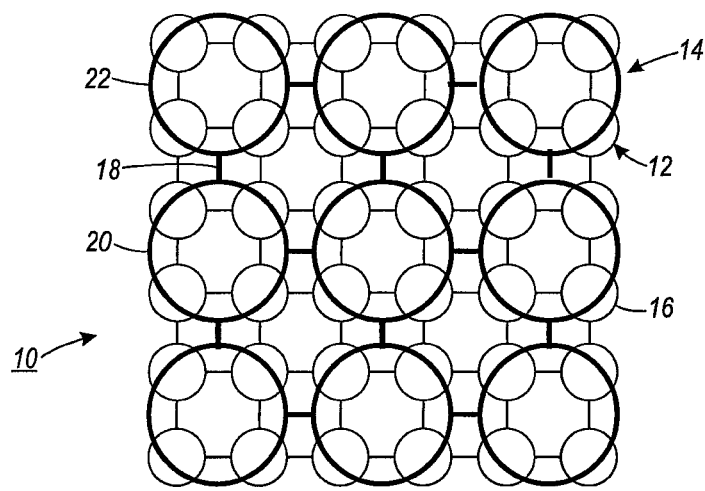
FIGS. 1A-1B illustrate a PSDD technique according to the presently described embodiments.

Two techniques for parallelizing breadth-first search for a model checker, for example, the Spin model checker described in, for example, Holzmann, G. J., *The Spin Model Checker: Primer and Reference Manual*, Addison-Wesley (2004), are described. Model checkers are used to verify systems, such as software systems (e.g. distributed software systems), that are implemented in a variety of practical applications, industries, fields and technologies. It will be appreciated that the Spin model checker is a widely known and efficient system. For example, it has been reported that the Spin model checker has been used, for example, to verify control algorithms for purposes such as flood control, communication software such as call processing software, software used in space exploration, control software in the automotive field and software in the medical device field. However, the Spin model checker is used as merely an example herein. Any suitable model checker may be used in conjunction with the presently described embodiments. The first technique noted above is a breadth-first search implementation of hash-distributed A*, Kishimoto, A., Fukunaga, A., Botea, A., Scalable, parallel best-first search for optimal sequential planning, Proceedings of the Nineteenth International Conference on Automated Planning and Scheduling (ICAPS-09) (2009), called hash-distributed breadth-first search (HD-BFS) and the other technique is called parallel structured duplicate detection, for example, as described in U.S. Pat. No. 7,805,454 which is incorporated herein by reference.

According to the presently described embodiments, however, PSDD has advantages over hash-distributed search when applied to model checking. First, HD-BFS uses delayed duplicate detection and must store duplicate search nodes temporarily while they are being communicated between threads. PSDD is able to detect duplicate states immediately after they are generated, thus abolishing the need to use extra memory in order to store them. Second, PSDD is able to preserve the ability of the model checker (e.g. Spin) to perform partial-order reduction—a technique used by model checkers to decrease the size of the search space. This means that, when using multiple threads, PSDD is often able to search a significantly smaller space than both HD-BFS and multi-core depth-first searches (such as those built into model checkers, such as the above-noted Spin model checker), both of which must be more conservative when performing partial-order reduction. Overall, the results of our experiments demonstrate that PSDD is faster and able to achieve greater parallel speedup than both HD-BFS and state-of-the-art multi-core depth-first search.

In addition to improving the performance of breadth-first search, some results demonstrate how PSDD can also successfully reduce the memory requirements of model checking by making use of external storage devices. In one experiment, PSDD is able to reduce the memory requirement of the search by over 500% when using a hard disk to supplement internal memory.

Depth-First Versus Breadth-First Search

Two of the most well-known graph search algorithms are depth-first search and breadth-first search. Depth-first search generates the successors of nodes in the graph (we call the generation of successors of a node 'expanding the node') in deepest-first order. This means that the most recently generated node will be the next node that is expanded. Breadth-first search, on the other hand, expands nodes in shallowest-first order. Spin, for example, uses depth-first search by default as it is able to check both safety properties (typically used to verify that something undesirable will not happen) and liveness properties (typically used to verify that something desirable will eventually happen), whereas Spin's breadth-first search algorithm is only able to verify safety properties.

Breadth-first search is important for model checking because it is guaranteed to find shortest counter-examples if the model violates a safety property. This is significant because many important properties of an asynchronous system are safety properties and, when debugging a system, one must understand the counter-example provided by the model checker in order to determine why the system is not behaving as desired. Depth-first search pays no heed to the number of steps used to reach a node in the state space and, therefore, may produce a counter example that is many steps longer than necessary. These long traces can be extremely hard to interpret as they may contain a lot of unnecessary transitions. To put this in perspective, on one model we have observed that depth-first search finds a deadlock and provides a trace consisting of 9,992 steps where breadth-first search finds a trace for the deadlock with the smallest number of possible steps—42.

While breadth-first search cannot be used directly to verify liveness properties, there has been work on efficient translations of liveness checking problems into safety checking problems, which can subsequently be verified by breadth-first reachability analysis. Given depth-first search's inherently sequential nature, checking liveness property using a breadth-first, instead of depth-first, strategy can better leverage the latest multi-core processors for greater parallel speedups.

Hash-Distributed Breadth-First Search

In this work, we are interested in improving the performance of breadth-first search for model checking in order to more quickly verify safety properties. Burns, E., Lemons, S., Ruml, W., Zhou, R., Best-first heuristic search for multicore machines, Journal of Artificial Intelligence Research 39, 689-743 (2010), discuss the difficulties in parallelizing best-first search algorithms and they show that many naïve implementations of parallel search actually perform worse than their serial counterparts. In order to successfully search a graph in parallel, the graph must be divided in a way that each thread performing the search can operate on an independent portion of the graph. A simple way to achieve this is to divide the nodes of the graph statically with a hash function. This framework is called hash-distributed search and was originally proposed as a method for parallelizing the A* algorithm, Evett, M., Hendler, J., Mahanti, A., Nau, D., PRA*—massively-parallel heuristic-search, Journal of Parallel and Distributed Computing 25(2), 133-143 (1995), and was later discovered by Kishimoto, Fukunaga, and Botea (2009) (as cited above) who call the algorithm hash-distributed A* (HDA*).

We have adapted the HDA* algorithm to breadth-first search. We call this new algorithm hash-distributed breadth-first search (HD-BFS). It proceeds as HDA* by distributing nodes among the different threads with a hash function. Each HD-BFS thread uses a pair of queues: one for the nodes at the depth-layer which is currently being searched and one for the next depth-layer in to which successors will be placed. Each thread also has a hash table containing all previously visited nodes that is used to prevent the search from expanding the same nodes multiple times. When searching, a thread will expand the next node from the queue for current depth-layer and the successors that are assigned to the expanding thread will be checked against the hash table and placed on the tail of the queue for the next depth-layer if they are not duplicates. Any successor that is not assigned to the expanding thread will be sent to the proper neighbor thread by placing them on the neighbor's incoming queue. In one implementation, we used the communication scheme from Burns et al. (2010) in order to allow nodes to be placed in the incoming queue of a remote thread asynchronously.

Periodically, each thread will check its incoming queue for new nodes which will be tested for membership in the hash table and if they are not duplicates they will be placed on the next depth-layer queue by the receiving thread. When none of the threads have nodes in their current depth-layer and when all of the communication queues are empty, the threads synchronize and swap their next queue with their current queue to move the search the next depth layer. If there are no open nodes after swapping to the next depth layer then the search space has been exhausted and the algorithm terminates.

Disadvantages

There are two major disadvantages to hash-distributed search when applied to model checking. The first is that hash-distributed search delays the detection of duplicate nodes when they are communicated between threads. When nodes are sent to another thread they are placed on the receiving queue for that thread and sit there until they are eventually received and checked against the receiving thread's hash table. This delayed detection of duplicate nodes can cause the search to require more memory as the duplicates reside in the receive queue instead of immediately having their memory freed for reuse. As we will see, the extra memory overhead created by delaying duplicate detection can be quite substantial.

The second disadvantage of hash-distributed search is that it must be conservative when applying partial-order reduction, Holzmann, G. J., Peled, D., An improvement in formal verification, Proceedings of the 7$^{th}$ IFIP WG6.1 International Conference on Formal Description Techniques (FORTE-94) (1994). Partial-order reduction is a technique used in model checking to reduce the size of the search graph. With partial-order reduction, only a subset of the successors are considered when expanding a node in the graph. When performing breadth-first search with partial-order reduction, Spin uses a test called the Q proviso, Bosnacki, D., Holzmann, G., Improving spins partial-order reduction for breadth-first search, Godefroid, P. (ed.), Model Checking Software, Lecture Notes in Computer Science. vol. 3639, p. 902, Springer Berlin/Heidelberg (2005), to prevent reduction in cases where completeness cannot be ensured. If the Q proviso is not satisfied when expanding a node then the node must be fully expanded and no reduction takes place. The Q proviso is as follows: when generating the successors of a node, if any of the successors resides on or is placed on the breadth-first search queue then the reduction can take place, otherwise the full expansion must happen. Bosnacki and Holzmann prove that this simple test allows breadth-first search to remain complete under partial-order reduction when searching for safety property violations and deadlocks.

With hash-distributed search, the successors of a state may not be assigned to the expanding thread. When this happens, the expanding thread does not have the ability to test if the successors are on or make their way on to the queue. To preserve completeness, HD-BFS must be conservative and assume that nodes sent to neighboring threads do not pass the Q proviso. This reduces the chances of successfully performing partial-order reduction because, in order to reduce, a thread must generate a successor that is assigned to itself and also passes the Q proviso. The greater the number of threads the greater the chance that successors will not be assigned to the expanding thread. This means that as the number of threads increases, the size of the search space will increase on models in which partial-order reduction can be otherwise applicable. Because of this, HD-BFS using multiple threads can actually perform worse than a serial breadth-first search because the former must search a significantly larger space to guarantee completeness.

Abstraction-Based Hashing

Both of the previous issues with hash-distributed search stem from the fact that the hash function used to assign nodes to threads is designed to uniformly distribute the nodes. This makes it uncommon for the successors of a node to be assigned to the expanding thread. Burns et al. (2010) present a modification to hash-distributed search that can be used to help alleviate this issue. Instead of using a hash function that distributes the nodes uniformly, a homomorphic abstraction function can be used distribute the nodes in a more structured fashion. The advantage of this approach, when using a carefully created abstraction, is that the successors of a search node will tend to map to the same abstract node as their parent and therefore will be assigned to the expanding thread. The disadvantage is that the search load may not be evenly balanced among the threads. Burns et al. show that using an abstraction instead of a uniformly distributed hash function can greatly increase the performance of HDA* on puzzle solving and planning problems.

For model checking, fewer communications means fewer duplicate nodes that reside in memory and also more chances to perform partial-order reduction. As we will see, this approach can greatly reduce the memory requirements and the size of the search space explored by hash-distributed search. Unfortunately, because the nodes are no longer distributed uniformly among the threads, this abstraction based implementation of HD-BFS (which we call AHD-BFS) gives very brittle performance for different numbers of threads. The nodes tend to be distributed unevenly causing some threads to be very busy and some threads to starve for work. This behavior hinders the ability of the search to fully exploit the available parallelism.

Parallel Structured Duplicate Detection

In accord with the presently described embodiments, instead of assigning nodes to threads a priori by using a hash function, a parallel reachability analysis using a structured duplicate detection technique, such as the framework called Parallel Structured Duplicate Detection (PSDD) that allows threads to dynamically divide the search effort, is used. PSDD uses a homomorphic abstraction to map nodes in the search graph to nodes in an abstract representation of the search graph. The abstraction is a many-to-one mapping that is typically created by projecting away some of the state information of each search node. The abstract node to which a search node maps is called the image of the search node under the abstraction. The abstract graph is then connected by adding an edge between every pair of abstract nodes that are the images of two search nodes that are connected by an edge in the search graph.

To perform the search, each node in the abstract graph has two queues (one for the current depth-layer and one for the next) that will contain the open nodes of the search graph that map to the given abstract node. Each abstract node also contains a hash table of all search nodes that map to it which have already been expanded. Threads acquire access to expand all of the open search nodes for a single abstract node at a time. The successors of such a search node will either map to the same abstract node or to one of the successors in the abstract graph. By claiming exclusive access to an abstract node and its successors, a thread can expand from the abstract node and perform immediate duplicate detection on the generated successors using only the data structures to which it has exclusive access. We call set of nodes corresponding to an abstract node and its successors a duplicated detection scope or just a scope for short.

Figure 1B:
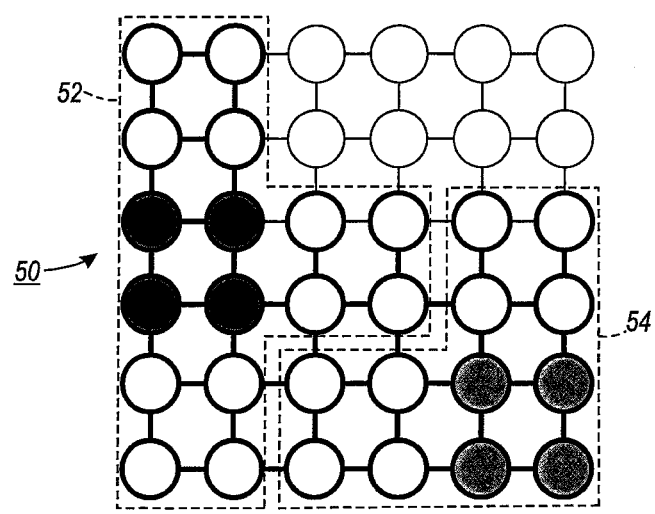

The image 10 in FIG. 1A shows an example graph 12 in light gray with a possible abstraction 14 of the graph drawn in dark black on top of it. This abstraction 14 groups together sets of four nodes such as node 16. There is an edge such as edge 18 in the abstract graph between each pair of abstract nodes such as nodes 20 and 22, for which there exists a pair of nodes in the underlying graph that are connected by an edge and whose images correspond to each respective abstract state. The image 50 in FIG. 1B shows two duplicate detection scopes 52, 54 in this graph, each defined by the gray nodes and surrounded by a dashed line. Both duplicate detection scopes consist of the gray nodes and all nodes that map to the successors of their image in the abstract graph 14. When expanding any of the gray nodes, all successors will correspond to a node that resides in the same duplicate detection scope.

To perform parallel search, different threads will each use the abstract graph to locate duplicate detection scopes that do not overlap with those being used by other threads. These disjoint duplicate detection scopes may be searched in parallel without requiring communication during the period when nodes are being expanded. With this scheme, the only time that threads must synchronize is when multiple threads require access the abstract graph at the same time. Only a single mutex is required to serialize access to the abstract graph and operations on the abstract graph tend to be quick.

The two duplicate detection scopes shown in FIG. 1B are disjoint as they do not share any nodes.

When a thread completes the expansion of all open search nodes mapping to its current abstract node, it can then release its duplicate detection scope, marking all abstract nodes in the scope as free to be re-acquired. Then the thread can try to acquire a new scope to search. If there are no free scopes with open search nodes at the current depth then the thread attempting to acquire a new scope must wait until another thread finishes expanding and releases its abstract nodes. This wait time can be reduced by using a finer grained abstraction with sufficiently many disjoint duplicate detection scopes. In practice, we find that abstractions can typically be made large enough that wait times are insignificant.

Eventually, as open search nodes become exhausted in the current depth-layer, there will be only a single thread actively searching as the other threads wait for abstract nodes to become free. When the final non-waiting thread releases its duplicate detection scope and finds that there are no free scopes with open nodes it will progress the search to the next depth layer. To do this, the current and next queues for each abstract node are swapped, all abstract nodes with open nodes in their new current layer are marked as free, waiting threads are woken up and the search resumes. If the new depth-layer contains no open search nodes then the search space has been exhausted and the threads can terminate.

A particular concept of PSDD is described in U.S. Pat. No. 7,805,454, which is incorporated herein by reference. For clarity and further explanation, as recited therein, let abstract node $y=p(x)$ be the image of node x under a state-space projection function $p(s)$ and let successors(y) be the set of successor abstract nodes of y in the abstract state-space graph. Then the following definition and theorem are provided.

Definition 1: The duplicate-detection scopes of nodes $x_1$ and $x_2$ are disjoint under a state-space projection function $p(s)$, if the set of successors of $x_1$'s image is disjoint from the set of successors of $x_2$'s image in the abstract graph, i.e., successors($p(x_1)$)∩successors($p(x_2)$)=∅.

Theorem 1: Two nodes cannot share a common successor node if their duplicate-detection scopes are disjoint.

Theorem 1 provides an important guarantee that can be leveraged to reduce the number of synchronization operations needed in parallel graph search. In particular, multiple threads can search disjoint portions of the graph, which corresponds to disjoint duplicate-detection scopes, without the need for communication. Unlike HD-BFS, duplicate states are detected in PSDD as soon as they are generated.

To enforce data locality, PSDD partitions the set of generated and stored nodes into nblocks, one for each abstract node, as in SDD. Because nodes in the same nblock share the same duplicate-detection scope, both Definition 1 and Theorem 1 generalize to nblocks, in addition to holding for individual nodes. The concept of disjoint duplicate detection scopes is used to parallelize graph search by assigning nblocks with disjoint duplicate-detection scopes to different processors. This allows processors to expand nodes in parallel without having to synchronize with each other, because it is impossible for one processor to generate a successor node that could also be generated by another processor.

Note that when an nblock is assigned to a processor for node expansions, the same processor is also given exclusive access to all of the nblocks in the duplicate-detection scope of that nblock. So, it can be said that the duplicate-detection scope of the assigned nblock is occupied by the processor. This means the processor does not need to worry about other processors competing for the nblocks it needs to access while generating successors for the assigned nblock.

PSDD provides at least two advantages over hash distributed search: 1) synchronization between threads may be less with PSDD because threads only need to synchronize access to the abstract graph when releasing and acquiring a new duplicate detection scope and 2) duplicates can be checked immediately instead of using extra memory to store duplicate nodes before they can be checked against the hash table.

PSDD provides an additional benefit when applied to model checking: it does not need to be conservative when performing partial-order reduction. Recall that HD-BFS did not have access to test if successor nodes reside on the breadth-first queue when the successors were not assigned to the expanding thread. In PSDD, however, the expanding thread has exclusive access to the data structures for the duplicate detection scope of the abstract node from which it is expanding. This means that PSDD is able to test if the successors that it is generating pass the Q proviso and, therefore, it does not need to be conservative when doing partial-order reduction. This gives PSDD a very big advantage over both HD-BFS and Spin's multi-core depth first search on many models.

Abstraction for Model Checking

PSDD relies on an abstract representation of the state space graph in order to exploit the local structure of the space. In Spin, each state in the search space consists of the set of processes whose executions are being modeled. Each process is represented by a finite automata which has a current state and a set of transitions. The abstraction that we used in our implementation of PSDD is, given any state, consider only the process type and automata state of a subset of the process IDs. For example, consider a state with seven processes numbered 0-6. One possible abstraction is to consider only a subset of processes, e.g. the automata states of the first two process IDs. This effectively 'projects away' process IDs 2-6, leading to a much smaller set of abstract nodes. We then use the transitions of the finite automata to determine the predecessor/successor relations in the abstract graph. Because only the state of a single component automata will transition between a node and its successors, the successors in the abstract graph are all of the possible single transitions of the process IDs that have not been removed in the abstraction. When computing the abstract graph, never claims are not considered by the abstraction, thus ensuring that only a single component automaton will change across a transition. For efficiency, we generate the abstract graph lazily as needed during the search. This provides the benefit of only instantiating the portions of the graph that are actually used. This lazy construction also has the added benefit of construction the graph in parallel (e.g. with multiple core processors of a processing device or multiple processors of a computer or multiple computers in a network or cluster with the execution of the search instead of doing it serially as a pre-processing step.

Experimental Results

In this section, we present the results of a set of experiments that we performed to evaluate the two methods of parallelizing breadth-first search. In addition, we compare to Spin's built-in multi-core depth-first search where applicable. The machine used in our experiments has two 3.33 GHz Xeon 5680 processors, each having six cores, and 96 GB of RAM.

Multi-Core Depth-First Search

Spin includes a state-of-the-art multicore depth-first search algorithm, Holzmann, G. J., Bosnacki, D., The design of a multicore extension of the spin model checker, IEEE Transactions on Software Engineering 33(10), 659-674 (2007). The algorithm connects each of the threads performing the search in a ring. Nodes may be passed from one thread to another around the ring in a single direction. Each thread is then responsible for expanding all of the nodes that fall within a particular depth-interval. When the successors of a node fall outside of an interval assigned to the current thread, the newly generated successors must be passed to the neighboring thread along the ring using a shared memory queue. This neighboring thread may then receive the nodes from the queue and begin expanding them. Using this technique, Holzmann and Bosnacki were able to achieve speedups of just over 1.6× at two threads on a set benchmark models and almost perfect linear speedup for two threads on a reference model that provided a set of tunable parameters. In their results, however, they show that this technique must be conservative when doing partial-order reduction. So, as with HD-BFS, the performance of multi-core depth first search can actually be worse than serial search when partial-order reduction is used.

In the following experiments, we compare to Spin's multicore depth-first search on models which do not contain safety property violations. We do not compare with depth first search on models with violations because it finds property violations via suboptimal paths. Since breadth-first search is constrained to only return optimal length traces and it must perform significantly more work, rendering the comparison unfair. On models without property violations, however, all algorithms must exhaust the search space and therefore will do a comparable amount of search.

Spin provides many parameters that may be tweaked to tune the search performance for different models. We compiled the multi-core depth-first with the following options for all models:

-DFULL_TRAIL-DSAFETY-DMEMLIM=64000

For each individual model we also used any additional parameter settings that were recommended by Spin after running with the default parameter set.

Effect of Delaying Duplicate Detection

In order to compare the effects of immediate duplicate detection of PSDD with delayed duplicated detection of HD-BFS, we compared the memory usage of the two algorithms. Our hypothesis was that HD-BFS would require more memory in order to store duplicate search nodes during communication, before they can be checked against the hash table by the receiving thread. The model that we choose for this experiment is a model of the classic dining philosophers problem with 10 philosophers. The model is constructed to avoid the classic deadlock situation and, therefore, the entire search space will be exhausted by the search algorithms. This removes the effects of tie-breaking that may be encountered when searching a model that contains an error. Also, with this model, the same number of states are expanded by all algorithms regardless of partial-order reduction and, therefore, we can conclude that any difference in memory usage must be attributed to immediate detection of duplicate nodes or lack thereof.

Figure 2:
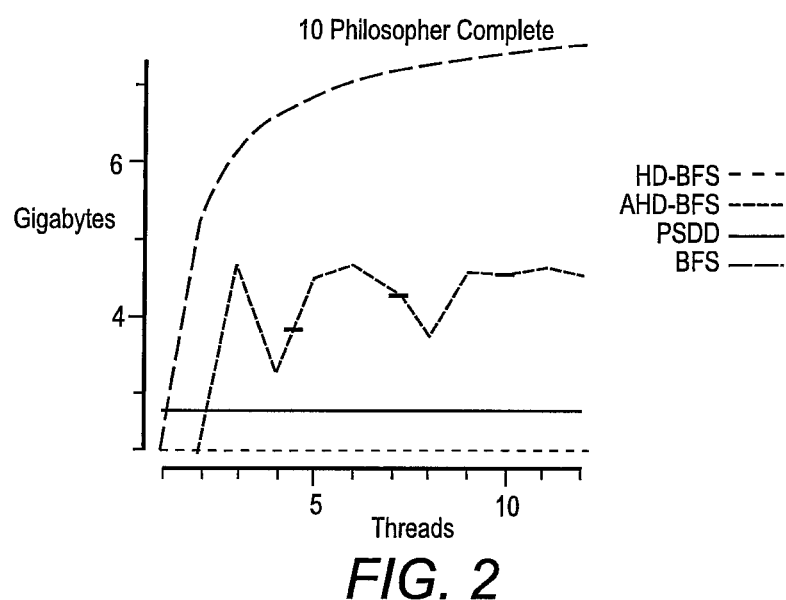
FIG. 2 shows experimental results.

FIG. 2 shows the memory usage reported by Spin for the 10 philosophers problem. The x axis gives the number of threads from 1-12 and the y axis shows the number of Gigabytes used to complete the search. Each line gives the mean of five runs at each thread count and the error bars show 95% confidence intervals on the mean. Breadth-first search only uses a single thread but we have extended the line for its single threaded performance across the x axis to ease comparison.

From this figure, we can see that breadth-first search and PSDD used less than 3 gigabytes of memory The memory usage for PSDD to remained nearly constant in the number of threads that performed the search. HD-BFS, however, required significantly more memory on this model when run with more than a single thread. The amount of memory required by HD-BFS increased sharply as more threads were added, up to six threads where it evened out. As mentioned above, this can be attributed to the fact that HD-BFS was required to store duplicate nodes in memory during communication instead of detecting them immediately. Due to the reduction in inter-thread communication, AHD-BFS used less memory than HD-BFS; however, it still required more memory than breadth-first search and PSDD for more than two threads.

In addition to the results shown here, we have observed that HD-BFS required more memory on all of the models that we have used in our experiments. Presumably, this is because of duplicate nodes, however, for other models the conservative partial-order reduction may also be a factor as we will see next.

Effect of Conservative Partial Order Reduction

In order to evaluate the performance degradation that hash distributed search and Spin's multi-core depth-first search suffer from due to conservative partial-order reduction, we performed an experiment using a model of the semaphore implementation from the "Plan 9 from Bell Labs" operating system, Pike, R., Presotto, D., Dorward, S., Flandrena, B., Thompson, K., Trickey, H., Winterbottom, P., Plan 9 from Bell Labs. Computing Systems 8(3), 221-254 (1995). The state space size for this model can change by up to approximately a factor of three depending on whether or not partial order reduction can be performed. This model is also of particular interest because, unlike the philosopher model used in the previous experiments, the semaphore model was taken from a real world model checking problem.

Figure 3A:
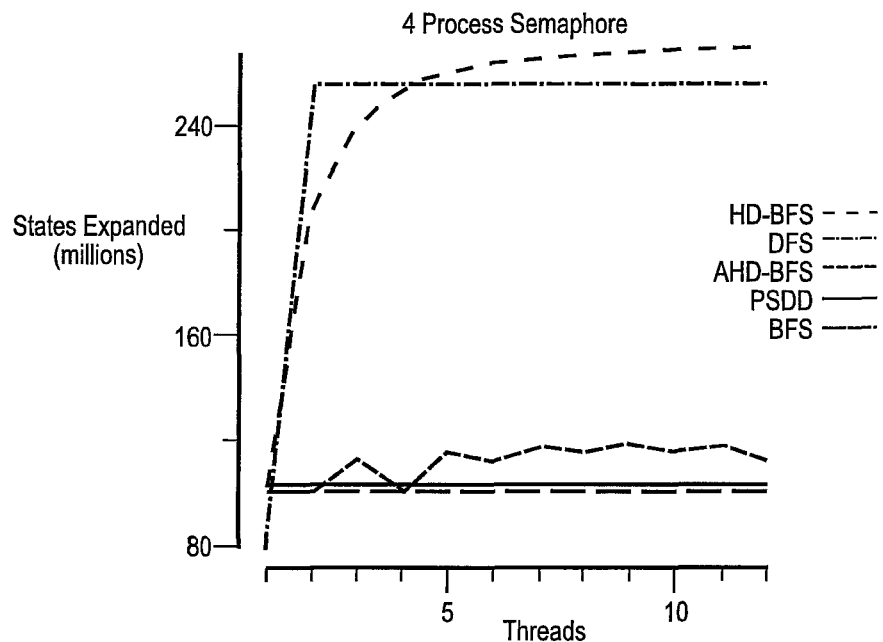
FIGS. 3A-3B shows experimental results.
Figure 3B:
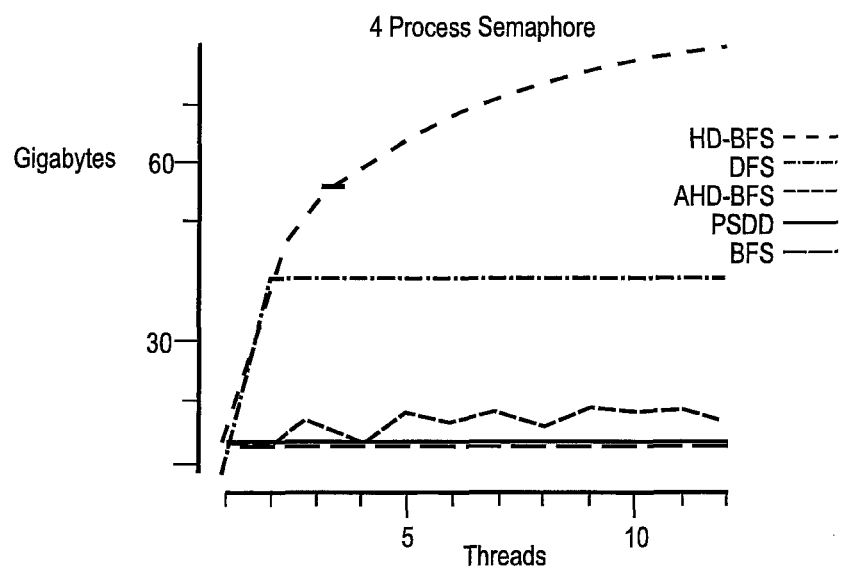
Figure 4A:
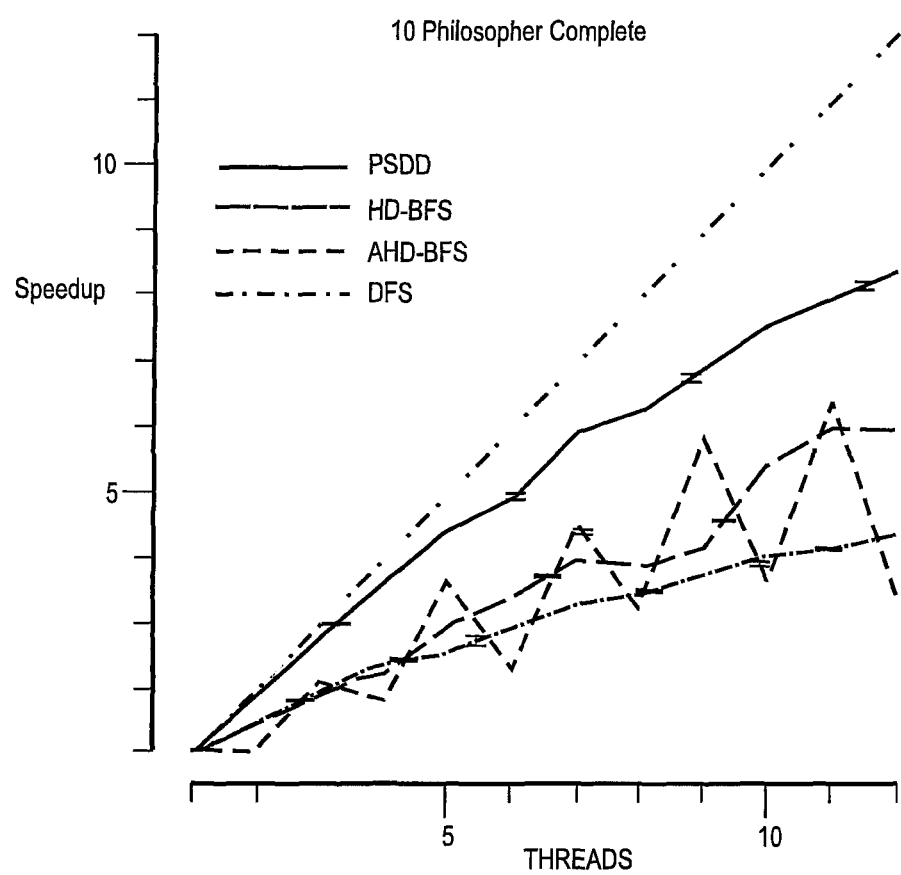
FIGS. 4A-4D show experimental results.
Figure 4B:
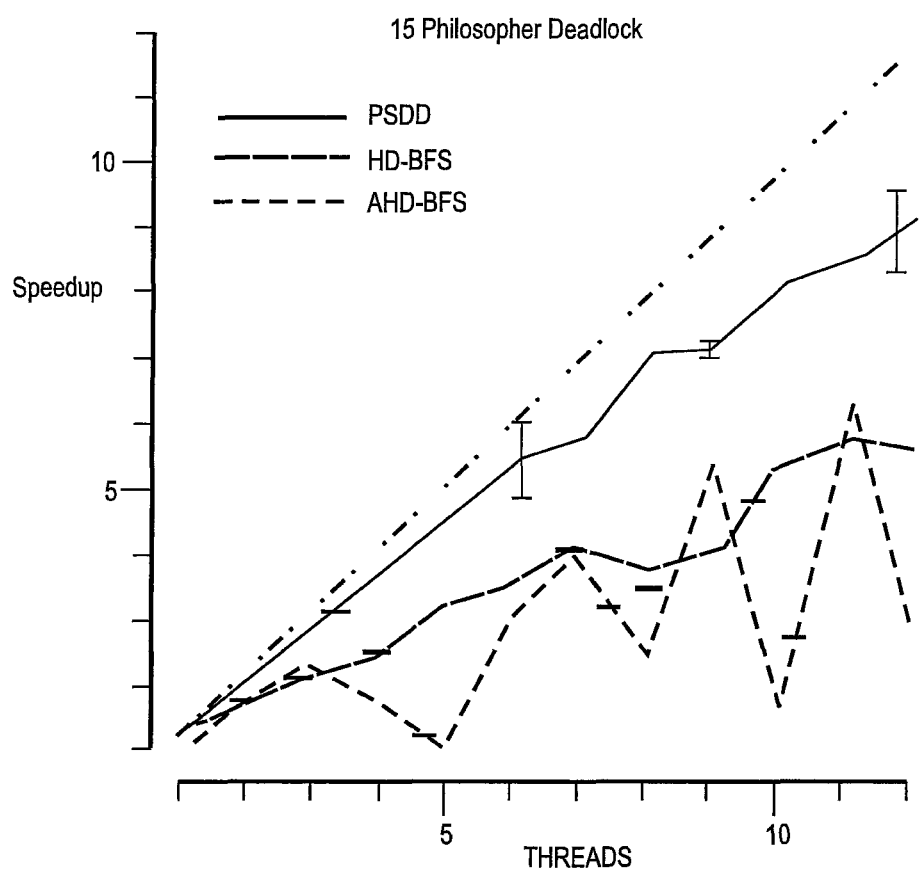
Figure 4C:
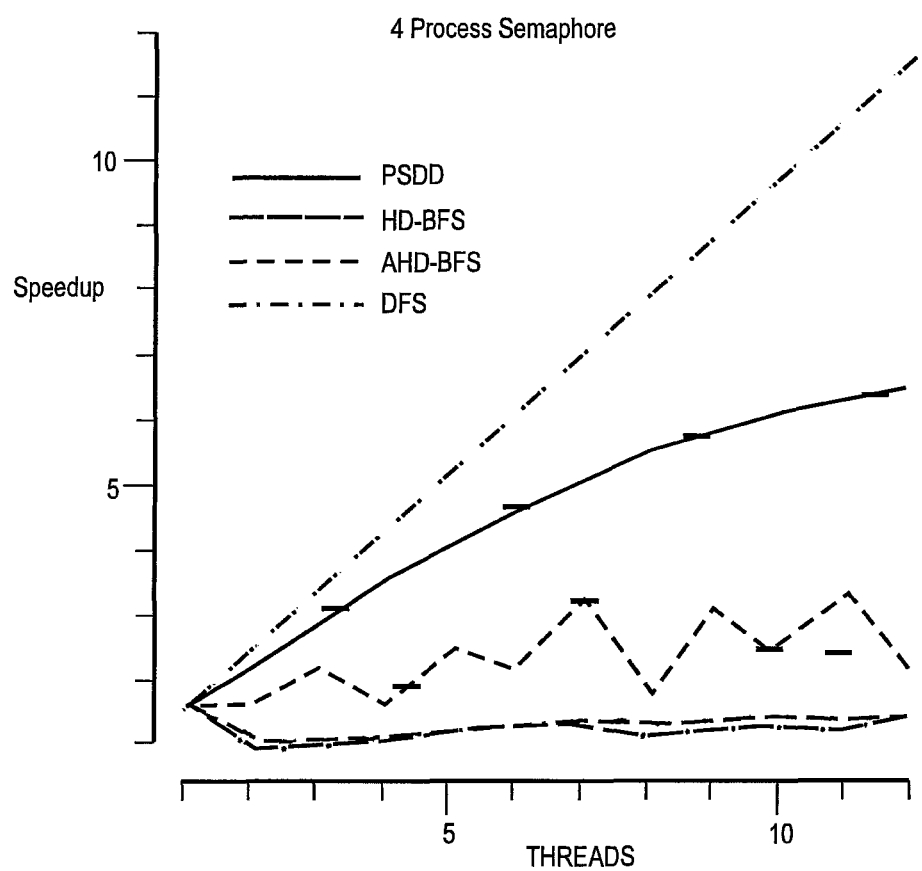
Figure 4D:
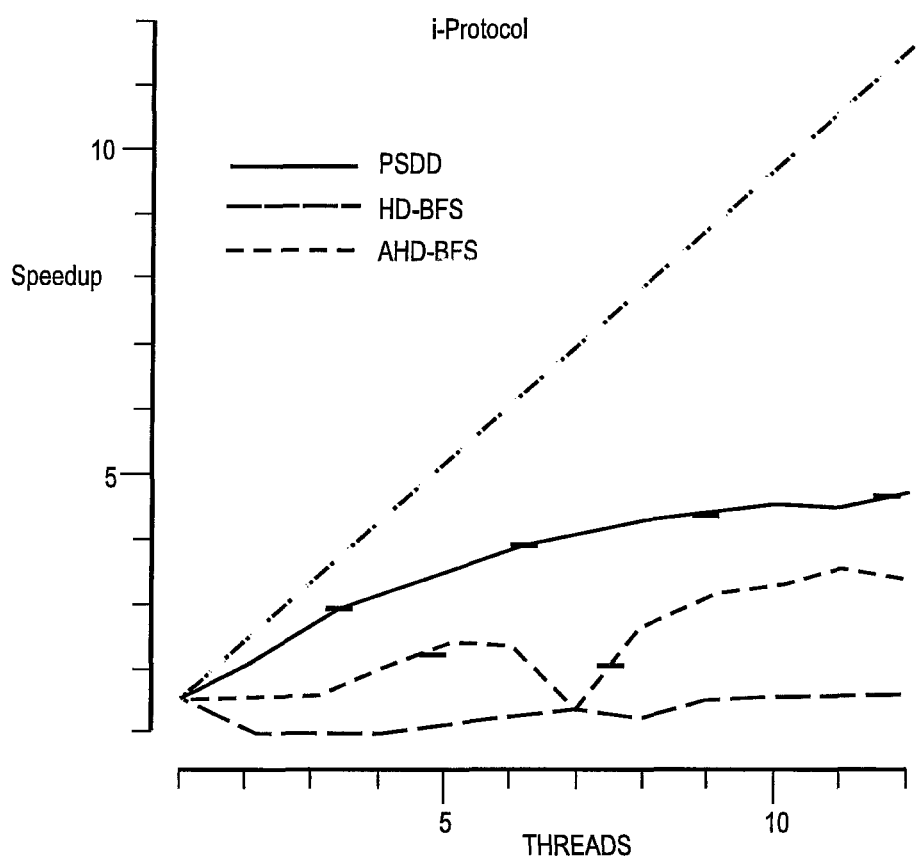
Figure 5A:
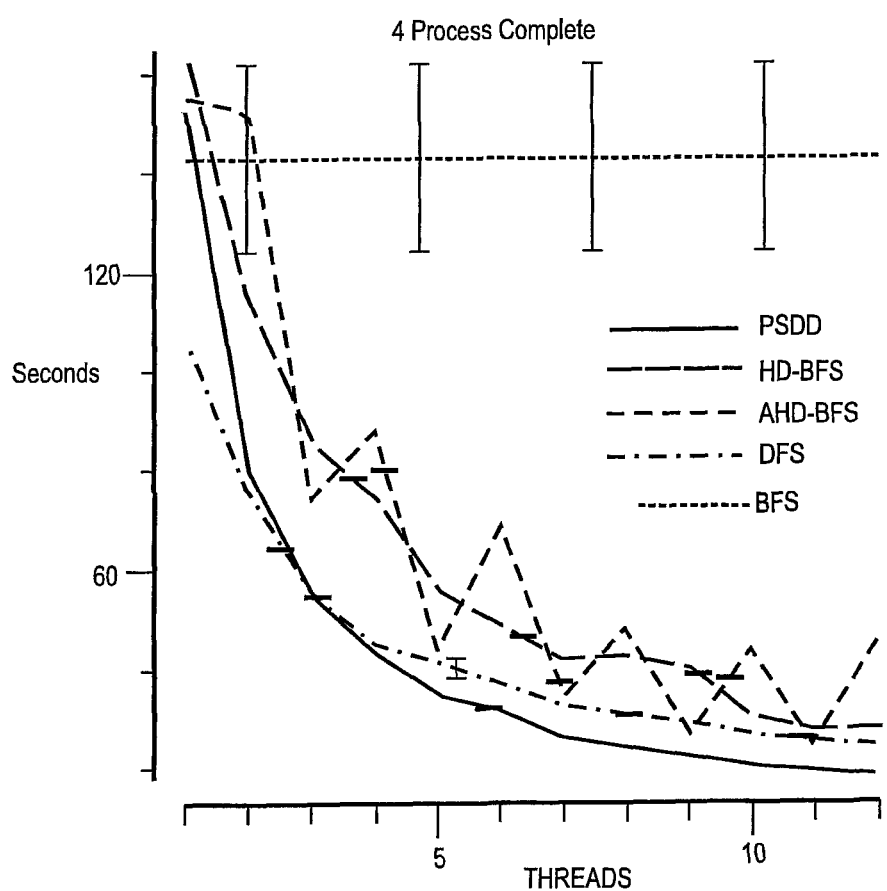
FIGS. 5A-5D show experimental results.
Figure 5B:
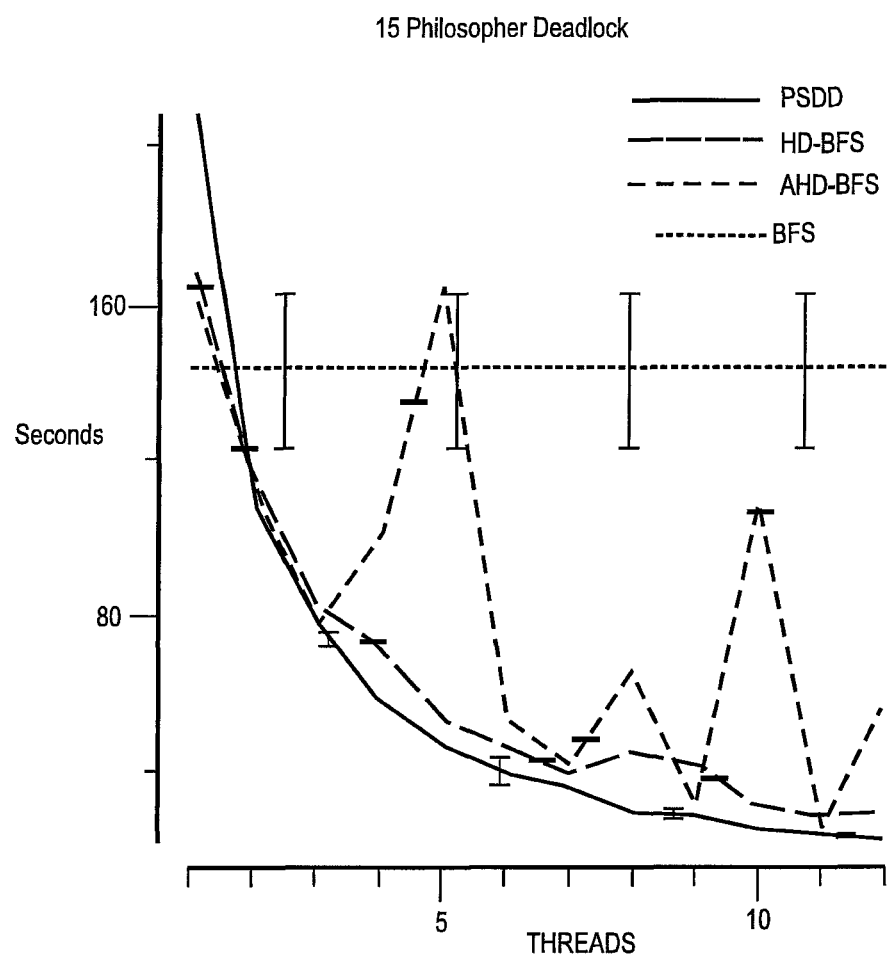
Figure 5C:
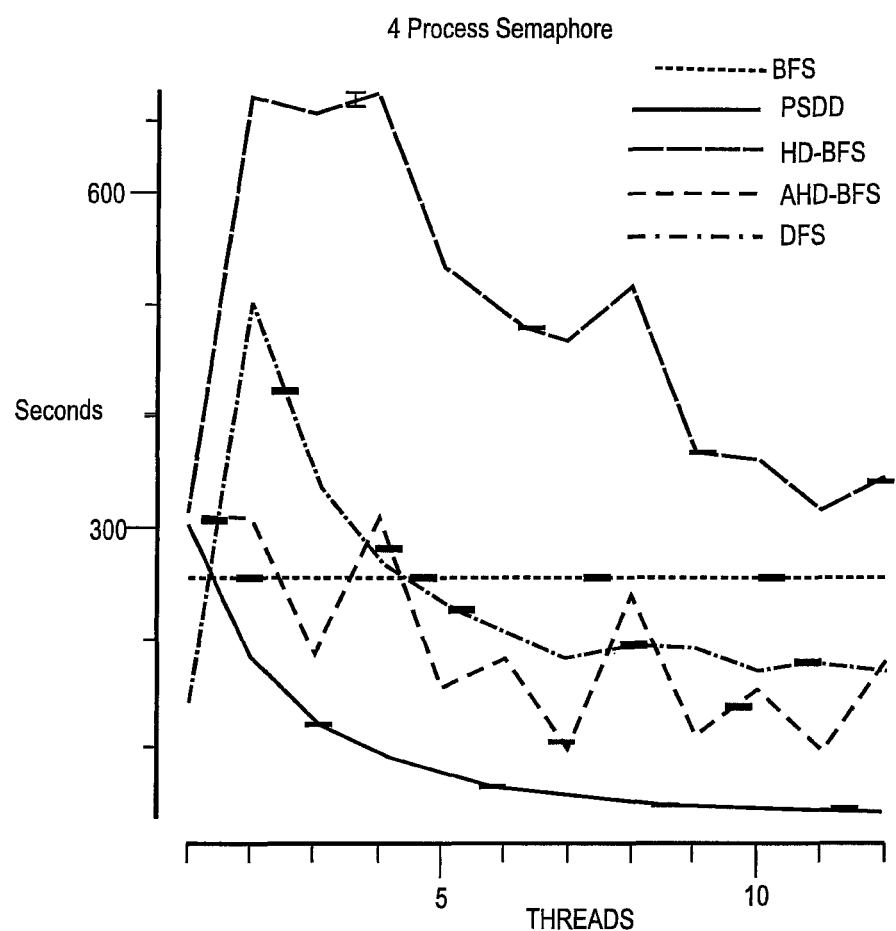
Figure 5D:
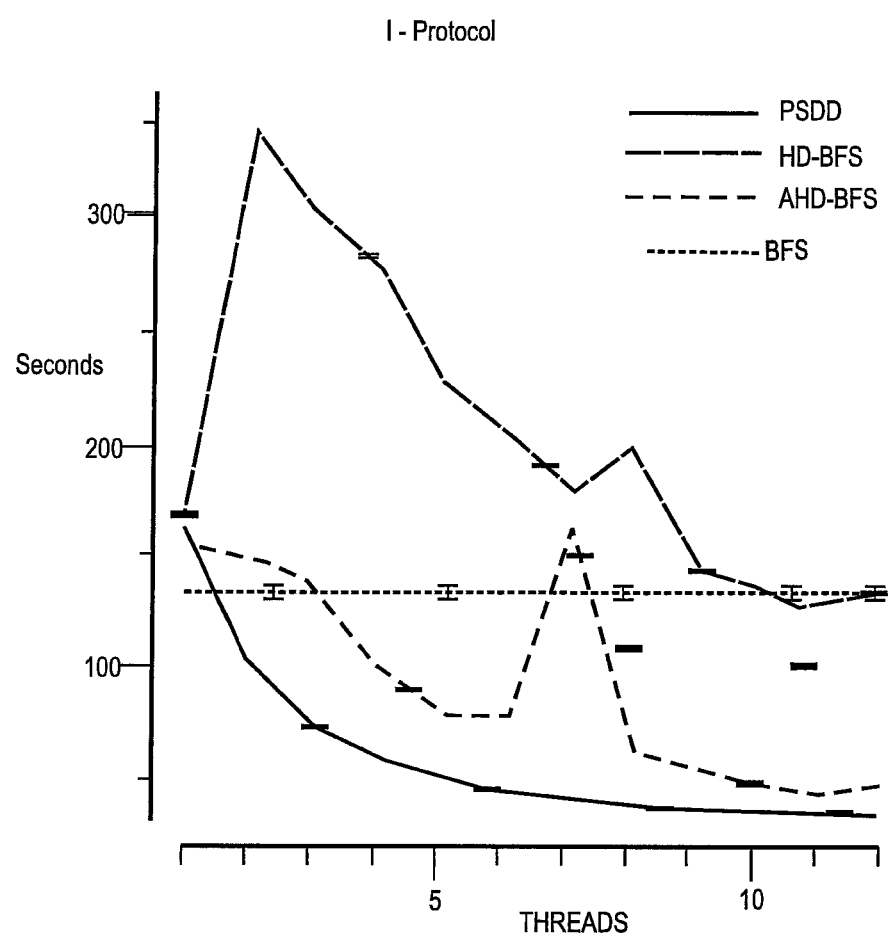

FIGS. 3A and 3B show the number of states and amount of memory expanded by PSDD, HD-BFS, breadth-first search and Spin's multi-core depth first search on the semaphore model with four separate processes contending for the semaphore. The format of the plots is the same as that of FIG. 2. We can see that breadth-first search expanded the fewest nodes and used the least memory in order to exhaust the configuration space of this model. PSDD expanded only slightly more nodes than breadth-first search. The reason that PSDD and breadth-first search expanded different numbers of nodes is that they may expand nodes within the same depth layer in a different order. This difference in tiebreaking can have a slight effect on the partial-order reduction causing slightly more or slightly fewer nodes to be expanded.

With a single thread, HD-BFS expanded about the same number of nodes and used about the same amount of memory as both of the other algorithms. As the number of threads was increased, however, the number of expansions and memory required by HD-BFS rapidly increased, flattening out at about five threads to more than twice the number of expansions required by PSDD and breadth-first search. The reason for the steep increase is that HD-BFS required more communications as the nodes were divided up between more threads. Each time a node is communicated the search conservatively assumed that it could not perform partial order reduction and therefore many redundant paths were explored that were not pursued by the other two algorithms. The plot also shows this same effect happens with Spin's multi-core depth-first search. The depth-first search suffers from the same conservative partial-order reduction as HDBFS and, for more than a single thread, it expanded many more states than PSDD and breadth-first search. Also, HD-BFS required almost 80 GB of memory when run with 12 threads.

Overall Performance

Next, we show the overall performance in terms of parallel speedup and wall-clock time for the different algorithms on four models. For PSDD and AHD-BFS, which both require an abstraction, we choose the fixed subset of processor IDs used in the projection experimentally. For each model we ran the algorithms using a small set of hand-chosen process ID sequences from 0-n and 1-n for small values of n (up to 7). The sequence that gave the best performance for each model was used in the following comparisons. We believe that the good performance exhibited by PSDD in the following results when using such a simple abstraction is strong evidence that finding a good abstraction for PSDD is not a difficult task.

FIGS. 4A-D show the parallel speedup and FIGS. 5A-D show the total wall-clock time that each algorithm required to search each of four different models using 1-12 threads. As in the previous plots, each line shows the mean performance across five runs with error bars giving the 95% confidence intervals. The x axes show the number of threads used from 1-12 and again the performance of breadth-first search is drawn across the x axis of each plot even though it was only run serially. The models used were the dining philosopher problem with 10 philosophers and no deadlock, the dining philosophers problem with 15 philosophers and a deadlock which is reachable in 42 steps, the Plan 9 semaphore with 4 contending processes, and the 0-level abstraction of the GNU i-Protocol model from Y. Dong, X. Du, G. Holzmann, and S. Smolka. Fighting livelock in the GNU i-Protocol: A case study in explicit-state model checking, International Journal on Software Tools for Technology Transfer (STTT) 4(4), 505-528 (2003) which contains a live-lock that is reachable in 72 steps, modified to avoid rendezvous as Spin complains that these do not maintain completeness with breadth-first search. Spin's multi-core depth-first search algorithm is not shown on the 15 philosopher model or the i-Protocol model because they both exhibit errors for which depth-first search does not find the shortest counter-examples and, therefore, does not perform a comparable amount of search.

FIGS. 4A-D show the parallel speedup of PSDD, HD-BFS, AHD-BFS and depth first search, computed as single-threaded time divided by the time required for the number of threads given on the x axis. Speedup is perhaps one of the most important metrics when comparing parallel algorithms as it is indicative of how well the algorithm will perform as the parallelism increases. The diagonal line in each of the speedup plots shows perfect linear speedup which is typically unachievable in practice, however, it can provide a useful reference point. The closer that the performance of an algorithm is to the diagonal line, the closer that its performance is to a perfect linear speedup. We can see from these figures that PSDD came the closest to linear speedup on all models. In fact PSDD always provided better speedup than the other parallel algorithms on these models.

FIGS. 5A-D show the wall-clock time, that is the actual time in seconds, for each algorithm on the four models. We can see from this figure that for greater than three threads, PSDD was able to solve all of these models more quickly than the other algorithms. On the two "real-world" models, the semaphore and i-Protocol models, HD-BFS actually required more time than serial breadth-first search when using more than a single thread. This is because its conservative use of partial order reduction caused it to search a much larger graph. Spin's multi-core depth-first search also suffered from this same issue, however, it seems to have made better use of parallelism and eventually, with greater than four threads it was faster than serial breadth-first search. Finally, we can see that AHD-BFS gives very erratic performance across different numbers of threads. We attribute this to poor load balancing among the threads due to use of the abstraction instead of uniform node distribution.

External Memory PSDD

Our results have demonstrated that PSDD requires less memory on model checking problems than hash-distributed search and it gives better parallel speedup and faster search times than both hash-distributed search and Spin's multicore depth-first search. PSDD is also able to act as an external memory search algorithm where external storage such as a hard disk is used to supplement core memory. External memory PSDD (or just external PSDD for short) works just like PSDD, however, when an abstract node is not in use by one of the search threads, it can be pushed off to external storage. This reduces the memory usage of the search algorithm from that of the entire search graph to just the size of the duplicate detection scopes acquired by each search thread.

As a preliminary experiment, we implemented external PSDD in Spin and used it to solve the deadlock-free 10 philosophers model. We ran on a machine with eight cores and four disks configured in a RAID 0 array. In this experiment, standard PSDD used an average of 233 seconds with a single thread to search the model whereas external PSDD required 1,764 seconds on average (both times had very little variance). When using all eight cores, PSDD's search time decreased to 34 seconds on average while external PSDD did not benefit from parallelism as it was I/O bound on a single disk controller. The machine used in our experiments has a single disk controller, therefore when using all eight cores, external PSDD did not benefit from parallelism. However, with multiple disk controllers, external PSDD will show performance improvements when using I/O parallelism. For example, R. Zhou and E. Hansen. Dynamic State-Space Partitioning in External-Memory Graph Search. Twenty-First International Conference on Automated Planning and Scheduling (ICAPS-11), Freiburg, Germany, June 2011 show performance improvements for up to four threads with external PSDD for automated planning. The primary benefit of external PSDD, however is that it was able to reduce the memory usage from 2.5 Gigabytes with standard PSDD down to around half of a Gigabyte when using a single thread. This is a 500% reduction in the memory usage of the search. In many cases this reduction in the memory requirement is much more important than reducing the search time because it is easier to wait longer for the search to complete, however, it may not be possible to add more memory. Because of this, the memory requirement is often the limiting factor determining whether or not a model can be validated with a model checker.

Further Discussion

In a preliminary experiment we have seen that external memory PSDD is able to reduce the memory requirement of search by a substantial amount. The penalty for external memory PSDD, however, is that it can take a lot longer than serial search as it has to access hard disk storage. We suspect that the performance of external PSDD can be increased substantially by using multiple RAID arrays in order to exploit I/O parallelism.

In our current implementation, external PSDD uses a lot more memory when run with more than a single thread as each thread must have its own duplicate detection scope in core RAM. With eight cores, external PSDD used around the same amount of memory as standard PSDD which does not use hard disk storage at all. To fix this problem, a new technique called edge partitioning, Zhou, R., Schmidt, T., Hansen, E. A., Do, M. B., Uckun, S., Edge partitioning in parallel structured duplicate detection, The 2010 International Symposium on Combinatorial Search (SOCS-10) (2010) has been developed to reducing the size of a duplicate detection scope to be only those search states that map to a single abstract node. Edge partitioning can enable external PSDD to use multiple threads while still having a very small memory footprint.

Until now, we have not discussed, in detail, how the chosen abstraction effects the performance of PSDD. In our experiments, the abstraction was selected by empirical evaluation using a small set of abstractions on each model. If the abstract graph is too small or is too strongly connected, however, then PSDD can suffer as it will be unable to find a sufficient number of disjoint scopes to search in parallel. We have found that the simple abstractions used in our experiments have provided a sufficient amount of parallelism. Recent work, however, has shown that PSDD can greatly benefit from a dynamic search space partitioning that changes the abstraction during search time, Zhou, R., Hansen, E. A., Dynamic state-space partitioning in external-memory graph search, Proceedings of the Twenty-First International Conference on Automated Planning and Scheduling (ICAPS-11) (2011). By using dynamic partitioning, the algorithm would be able to select an abstraction that is more balanced, reducing the peak memory requirement of external search, and less connected, increasing its ability to exploit parallelism.

We have compared two techniques for parallelizing breadth-first search in the Spin model checker in order to find shortest traces for deadlocks and safety properties violations. Our results showed that Parallel Structured Duplicate Detection provides benefits over both hash-distributed search and Spin's multi-core depth-first search because it gives better parallel speedup and it requires significantly less memory. We have also demonstrated that external PSDD can reduce the memory requirements of model checking even further by taking advantage of cheap secondary storage such as hard disks. As CPU performance relies more on parallelism than raw clock speed, the techniques presented here enable model checking to better exploit the full capabilities of modern hardware.

Partial-order reduction is a widely used technique for tackling the state-space explosion problem in model checking. However, combining it with parallelization techniques has been a challenge in the past. Here, we show that not only PSDD is effective for parallel reachability analysis, but it also preserves the full power of Spin's partial-order reduction algorithm.

The above has disclosed an approach to model checking using parallel structured duplicate detection (PSDD). The approach leverages the concept of disjoint duplicate-detection scopes to exploit the local structure of a search graph in a way that significantly reduces the overhead for synchronizing access to stored nodes in duplicate detection. It also allows for partial order reduction techniques to be implemented and/or maintained to the fullest extent possible during a parallel reachability analysis.

Figure 6:
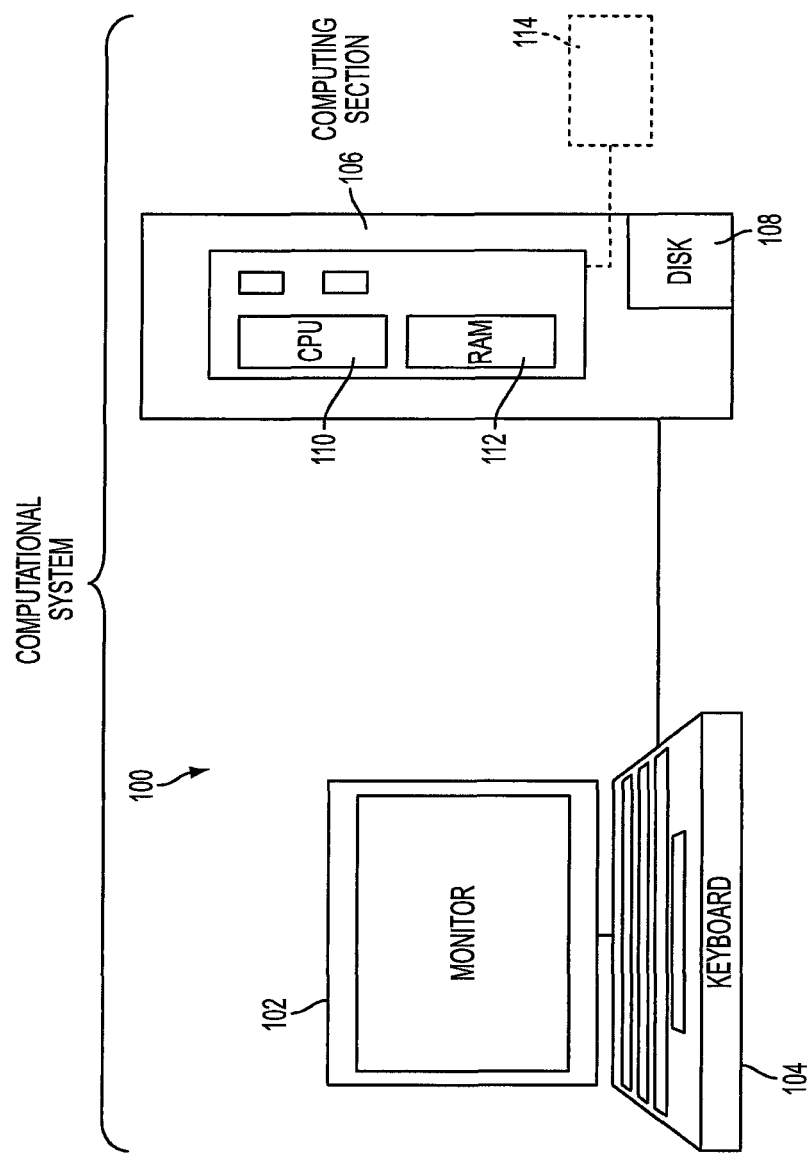
FIG. 6 illustrates a system according to the presently described embodiments.
Figure 7:
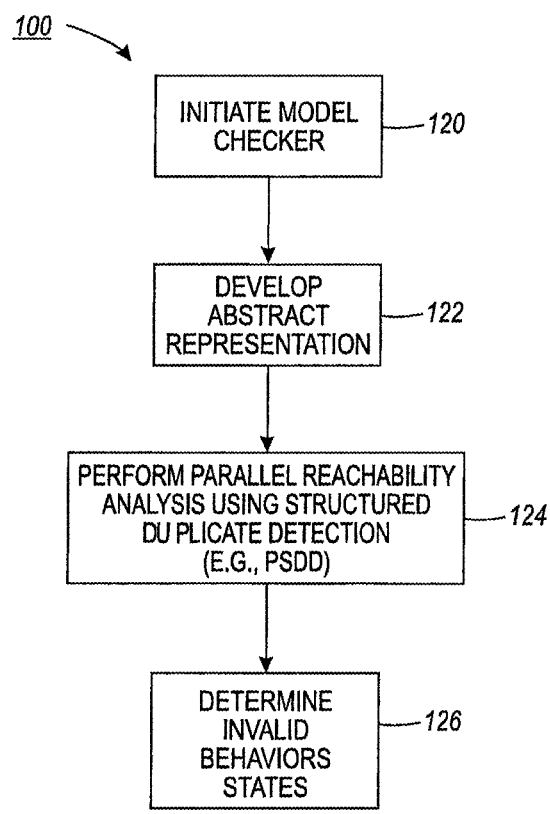
FIG. 7 is a flow chart of a method according to the presently described embodiments.

Concepts described herein may be implemented on a variety of computational systems. As noted above, model checkers may be implemented in a variety of environments in various arenas. Accordingly, the presently described embodiments may likewise be widely implemented. An example of one such computational system 100 is shown in FIG. 6, which includes, among other components, a monitor 102, keyboard 104, computing section 106 and external memory such as disk 108. Computing section 106 includes components such as a CPU or other computational component 110, and internal memory 112, such as a RAM. It is of course to be understood computing section 106 may include other components and may be designed in other configurations than shown here. For example, the computational component 110 may include a single core processor or multiple core processors. Indeed, an example processor mentioned above includes two processors, each having six core processors. In this regard, for example, each core processor will process a single disjointed scope described above to achieve the parallel processing noted herein. Further, the processors used to implement the embodiments of the presently described embodiments may be distributed in different computing sections in a network configuration. In any configuration noted above, the processors may, in at least one form, be programmed to execute code or instructions to achieve the methods contemplated by the presently described embodiments, including the method 100 described hereafter. External memory 108 is considered external, as it is external to computing section 106, which results in much slower I/O operations, as compared to internal memory 112. Also, disk 108 may or may not be physically enclosed with computing section 106, as illustrated by optional disk 114. For example, the optional disk 114 might be a network drive or other type of alternative memory device. It should be appreciated that these memory devices described (or others) may be configured and operative to interact with processing and/or computing components, such as the computing section 106 and computational component 110 (including, for example, multiple core or multiple processor configurations), to allow for computer implemented methods described herein to be performed. In this regard, the memory or storage devices may be configured to improve input/output efficiency and/or may complement one another (such as external storage complementing RAM devices) to, for example, improve scalability and achieve other advantages. In this regard, the memory devices, in one form, serve as a non-transitory computer readable medium to store machine readable data and/or instructions for execution. Also, the memory or storage devices could take a variety of physical forms including solid-state forms or magnetic disk configurations FIG. 7 provides a flow chart 100 illustrating the process for model checking using the PSDD concepts of the present application. The method described in connection with FIG. 7 is merely exemplary and, in one form, may be implemented on a computational system such as that described in connection with FIG. 6 above. In step 120, a model checker is initiated (e.g. by a user command from the keyboard or in an automated manner by the computing section). The model checker is, in at least one form, implemented in a shared and/or distributed memory and parallel computing environment. As noted above, any of a variety of model checkers may be used, although the example used herein is well-known Spin model checker. It will be appreciated that the model checker can be stored on a computational system in the variety of storage devices described, or others, in any manner that will facilitate effective implementation and/or execution of the model checker with the presently described embodiments. The implementations of the various model checkers may vary as a function of the model checker and the model being checked. For example, for the Spin model checker, its main executable is an auto code generator that produces the C source code of another model checker that is specific to the system or model being checked, and once that auto-generated model checker gets compiled and turned into an binary executable, it can be invoked to perform the model checking task to either find bugs or prove the correctness of the model or system. The implementation of the presently described embodiments modifies the auto code generator of Spin to emit additional C code that implements PSDD. Thus, there may be an optional compilation in between the initiation of Spin (e.g. if the auto code generator is considered 'Spin') and the actual binary code (after proper compilation of the C source code generated by Spin) used to check the model or system. Other model checkers may or may not have to use this "auto code generation" approach.

In step 122, state-space abstraction is developed to form an abstract state-space graph as an abstract representation of a system (e.g. a software system or model to be verified). For example, as noted above in greater detail, the abstraction may consider, given any state, only the process type and the automaton state of a fixed subset of the processes. In one form, the graph includes abstract nodes (and/or edges) representing a system. Based on the abstract state-space graph, the original state-space graph is partitioned into multiple independent regions that do not interfere with each other for a period to time during the search process. Of course, in one form, the computing section 106 (including any computational component 110 and suitable memories) accomplishes this task. In step 124, searching or verification of the system (e.g. a software system or model to be verified) is undertaken employing a parallel reachability analysis using a structured duplicate detection technique (e.g. parallel structured duplicate detection). In this regard, parallel structured duplicate detection (PSDD) may be implemented as noted above or in other ways that will be apparent to those skilled in the field. In at least one form, the parallel structured duplicate detection technique distributes a search workload across multiple processing units in order to maximize an amount of time during which the independent regions are capable of being maintained as independent. During this time, in at least one form, the individual processing units or core processors may search and verify portions of the state-space graph in parallel and use suitable storage areas if necessary. As searching or verification is accomplished, which includes expanding the nodes to arrive at a conclusion, determinations of invalid behaviors or states are made (at 126). In this regard, in one form, a sequence of system transitions that led to the invalid behavior or states may be determined. In one form, users are notified of the sequence of system transitions that led to the invalid behavior or states through any of a variety of known techniques, including those using the monitor 102. Of course, if no invalid behaviors or states are found, the correctness of the system is verified or proven. This, too, may be communicated to users through known techniques (e.g. through the monitor 102).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for verifying a system comprising:
receiving a state space graph modeling a finite state space of the system, each node of the state space graph corresponding to a state of the system, and each edge of the graph corresponding to a transition between a pair of nodes;
generating an abstract graph abstractly representing the state space graph from the state space graph;
performing a parallel reachability analysis directly on the state space graph by traversing the finite state space graph as received in parallel using a structured duplicate detection technique based on the abstract graph;
determining invalid behaviors or states of the system based on the performing of the parallel reachability analysis using the structured duplicate detection technique; and
proving the correctness of the system if no invalid behaviors or states are found,
wherein the state space graph models a plurality of processes, each represented by a finite-state automaton, wherein each state in the state space graph includes a current state for each of the plurality of processes and transitions for the current state,
wherein the generating includes, for each state of the state space graph, mapping the state to an abstract state of the abstract graph, the abstract state including the one or more current states of the state corresponding to a subset of the plurality of processes, and
wherein the transitions are used to determine predecessor and successor relations and only automata of processes of the subset are used to generate the abstract graph.

2. The method as set forth in claim 1 further comprising notifying a user of a sequence of system transitions that led to the invalid behaviors or states.

3. The method as set forth in claim 1 further comprising initiating a model checker in a shared or distributed memory and parallel processing environment.

4. The method as set forth in claim 1 wherein partial order reduction is maintained.

5. The method as set forth in claim 1 wherein the abstract graph is generated lazily as needed.

6. The method as set forth in claim 1 wherein the abstract graph is generated in parallel by multiple core processors of a processing device, or multiple processors of a computer or multiple computers in a cluster.

7. The method as set forth in claim 1 wherein the generating comprises ensuring that only a single automaton will change across a transition.

8. A computational system comprising:
   means for receiving a graph modeling a finite state space of a system, the state space graph defined by finite-state automata representing processes of the system, wherein each process is represented by a finite-state automaton, wherein each node of the graph corresponds to a state of the system, and wherein each edge of the graph corresponds to a transition between a pair of nodes, and wherein each state in the state space graph includes a current state for each of the plurality of processes and transitions for the current state;
   means for generating an abstract graph abstractly representing the state space graph from the state space graph, wherein the generating includes, for each state of the state space graph, mapping the state to an abstract state of the abstract graph, the abstract state including the one or more current states of the state corresponding to a subset of the plurality of processes, wherein the transitions are used to determine predecessor and successor relations and wherein the abstract graph is defined by the finite-state automata of only a subset of the processes;
   means for performing a parallel reachability analysis directly on the state space graph by traversing the state space graph as received in parallel using a structured duplicate detection technique, the structured duplicate detection technique using the abstract graph; and
   means for determining invalid behaviors or states of the system to be verified based on the performing of the parallel reachability analysis using a structured duplicate detection technique.

9. The computational system as set forth in claim 8 further comprising means for notifying a user of a sequence of system transitions that led to the invalid behaviors or states.

10. The computational system as set forth in claim 8 further comprising a means for initiating a model checker.

11. A computational system comprising:
    at least one processor operative to:
       receive a state space graph modeling a finite state space of a system, each node of the state space graph corresponding to a state of the system, and each edge of the graph corresponding to a transition between a pair of nodes;
       generating an abstract graph abstractly representing the state space graph from the state space graph, the generating including mapping nodes of the state space to abstract nodes of the abstract graph;
       perform a parallel reachability analysis directly on the state space graph by traversing the state space as received in parallel using a structured duplicate detection technique, the structured duplicate detection technique using the abstract graph; and
       determine invalid behaviors or states of the system to be verified based on the parallel reachability analysis using the structured duplicate detection technique,
       wherein the state space graph models a plurality of processes, each represented by a finite-state automaton, wherein each state in the state space graph includes a current state for each of the plurality of processes and transitions for the current state, wherein the generating includes, for each state of the state space graph, mapping the state to an abstract state of the abstract graph, the abstract state including the one or more current states of the state corresponding to a subset of the plurality of processes and wherein the transitions are used to determine predecessor and successor relations and only automata of processes of the subset are used to generate the abstract graph; and
    storage devices operative to interact with the processor to perform the parallel reachability analysis using structured duplicate detection technique.

12. The computational system as set forth in claim 11 wherein the at least one processor comprises a processor having multiple core processors.

13. The computational system as set forth in claim 11 wherein the at least one processor comprise multiple processors.

14. The computational system as set forth in claim 11 wherein the multiple processors are distributed in a network.

15. The computational system as set forth in claim 11 wherein the storage devices comprise internal and external memory devices.

16. The computational system as set forth in claim 11 wherein the storage devices are configured to improve input/output efficiency.

17. The computational system as set forth in claim 11 wherein the storage devices comprise solid state devices or magnetic disks.

18. The method as set forth in claim 1 wherein the parallel reachability analysis includes traversing the state space graph using the structured duplicate detection technique, the structured duplicate detection technique using the abstract graph.

* * * * *